United States Patent [19]

Merikallio et al.

[11] 4,283,840

[45] Aug. 18, 1981

[54] METHOD FOR MANUFACTURING A SUPPORT CONSTRUCTION FOR THE WINDING IN AN ELECTRICAL MACHINE

[75] Inventors: Erkki Merikallio, Espoo; Paavo Paloniemi, Helsinki, both of Finland

[73] Assignee: Oy Stromberg AB, Helsinki, Finland

[21] Appl. No.: 47,694

[22] Filed: Jun. 12, 1979

[30] Foreign Application Priority Data

Jun. 13, 1978 [FI] Finland ............................ 781878

[51] Int. Cl.$^3$ ............................................ H02K 15/12
[52] U.S. Cl. ........................................ 29/596; 310/43; 310/260
[58] Field of Search ................... 29/596, 598; 310/260, 310/270, 43

[56] References Cited

U.S. PATENT DOCUMENTS

| 3,075,112 | 1/1963 | Andersen et al. ................ 310/260 |
| 3,151,260 | 9/1964 | MacCracken, Jr. et al. ... 310/260 X |
| 3,344,297 | 9/1967 | Bishop et al. .................... 310/260 |
| 3,601,646 | 8/1971 | Balke et al. ...................... 310/270 |
| 3,949,257 | 4/1976 | Cooper et al. ................... 310/260 |

*Primary Examiner*—Carl E. Hall
*Attorney, Agent, or Firm*—Cushman, Darby & Cushman

[57] ABSTRACT

A method for the manufacture of a support construction for the coil ends in an electrical machine. According to the method, hollow objects substantially filled with a powdery filler agent and provided with porous walls are placed into the winding before its impregnation. The air spaces in said hollow objects are substantially filled in connection with the impregnation such that said objects, after hardening of the impregnation agent, constitute strong and rigid cast-plastics components.

9 Claims, 3 Drawing Figures

U.S. Patent  Aug. 18, 1981  4,283,840
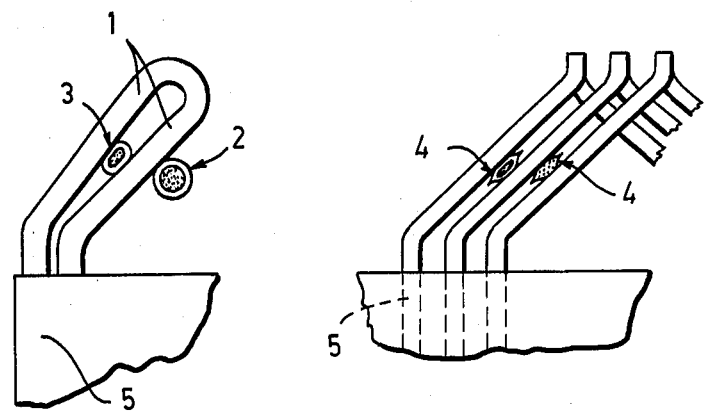
FIG. 1
FIG. 2a
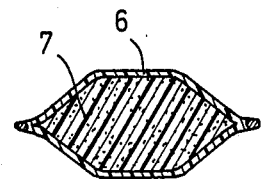
FIG. 2b

METHOD FOR MANUFACTURING A SUPPORT CONSTRUCTION FOR THE WINDING IN AN ELECTRICAL MACHINE

The subject of the present invention is a method for the manufacture of a support construction for the coil ends in an electrical machine.

The coil ends of the stator windings of large electrical machines (usually high-voltage motors and generators) are, as a rule, supported to each other by means of support pieces placed between the coils and by means of support rings surrounding the winding, and to the machine frame by means of appropriate support insulators. In this way the coil end can be made sufficiently rigid and strong. In the manufacture of the support construction, two different types of manufacturing methods are known:

From the Swiss letters Pat. No. 452,983 a method is known that makes use of impregnation of the winding (as a rule by means of solvent-free impregnation resins). According to this method, unimpregnated fibreglass cord is wound around and between the coils, which cord absorbs a binder agent into itself in connection with the impregnation, which binder agent is then hardened at a high temperature after the impregnation. Drawbacks of this method are the difficulty in winding and threading the fiberglass cord, the tendency of the binder to flow away from the fibreglass cord, and the high cost of fibreglass cord.

On the other hand, from the U.S Pat. Nos. 3,151,260 and 3,949,257, a method is known that makes use of the cast-resin technique and according to which tubular or trough-shaped support rings are filled with conventional cast-resin mix with powder filler. The supports between the coils are separate support pieces, made, e.g., out of pre-impregnated polyester-fibre felt. Drawbacks of this method are, e.g., the necessity of treating the cast-mix at a high temperature in order to achieve maximum filler content, the necessity to use over-pressure at the stage of filling the support ring; moreover, the manufacturing process involves several working steps and therefore becomes unreasonably expensive.

Moreover, from the German announcement publication No. 1,275,274, a method is known from another field of cast-resin technique, in which method a casting mould is filled with coarse-structure filler before casting, and the intermediate spaces in between the filler particles are filled by casting in the conventional way by using a cast-resin mix provided with a fine-grain filler agent.

An object of the present invention is to eliminate the drawbacks of the methods mentioned above.

The present invention is based on the idea that ring and support-piece components described in connection with the method of the above U.S. patents and provided with porous walls are already filled with an appropriate powdery filler agent in advance. After filling, the components concerned are mounted into the machine. The components concerned are at that time soft and elastic, which makes the installation work easy and rapid. By means of the impregnation method described in the above Swiss patent, a binder agent is absorbed into the filler, and the binder is then hardened in the conventional way. Thus, according to the method of the present invention, certain components belonging to the support construction are before impregnation filled with a dry powdery filler agent, and those parts are after the impregnation and after hardening of the impregnation agent comparable with filled cast-resin components, strong and rigid.

As expressed more precisely, the method in accordance with the present invention is mainly characterized in that hollow objects substantially filled with a powdery filler agent and provided with porous walls are placed into the winding before its impregnation, the air spaces in said hollow objects being substantially filled in connection with the impregnation and said objects, after hardening of the impregnation agent, constituting strong and rigid cast-plastics components.

It should, however, be noted that, when the scope of protection is being defined, the present patent specification and the attached drawing shall be taken into account as a whole in the way required by the Patents Act.

By means of the invention, remarkable advantages are achieved. Thus, in the parts of the support constructions filled with powder, a very high filler content is achieved. Owing to this, the heat expansion factors of the components concerned are considerably lower than those of conventional cast-plastics constructions. In this way the heat expansion differences between the windings and the frame and the support constructions can be made as little as possible, which results in good durability at extreme temperatures, i.e. both at very cold and at very hot temperatures.

The invention will be examined more closely below with reference to the embodiments in accordance with the attached drawing.

FIG. 1 shows the coil end space of the winding of an electrical machine as a section.

FIG. 2a shows support pieces as placed between coils,

FIG. 2b shows the cross-section of a support piece on an enlarged scale.

Ready-insulated coils 1 are lowered into the grooves 5 and connected in the ordinary way. At the same time with the manufacturing of the coils, the powder-filled objects 2, 3, 4 are manufactured. The pieces 2 and 3 are of flexible hose or tube; it is advantageous if they are appropriately porous, e.g. out of tight fabric. They are filled by means of appropriate shaking from a funnel construction in itself known. When rings 2 and 3 are formed out of them, the ends are bound either side by side or on top of each other.

The filler agent must be so finely divided that the binder agent cannot flow away from between its particles and that the porous walls of the pieces 2, 3 and 4 are tightened by themselves when the impregnation agent, when flowing away partly, carries particles of filler agent into the pores in the wall. A preferred particle size range is 1 $\mu$m to 1 mm. It is essential that the filler agent contains different particle sizes and forms a tightly packed particle size distribution. Moreover, it is advantageous from the point of view of reducing dust formation if the filler agent includes glass balls, which are less dusty than, e.g., quartz powder. When the impregnation agent penetrates into the filler agent, the latter is at the same time packed tightly.

Up to 30% by weight of the powdery filler can be fibres having lengths up to 10 mm.

The parts 4 are support pieces between coils. They may be manufactured, e.g., out of hose 2 if its wall is made of thermoset plastics, by melting off a loosely filled hose 2 at appropriate positions; at the same time a melting joint is formed that seals the pillow-shaped piece 4. The pieces 4 are pushed into appropriate positions between coils.

After installation of the pieces 2, 3 and 4, the coils can be additionally bound to each other in a way in itself known, and likewise the winding may be provided, e.g., with support insulators supported against the piece 2 if these operations are considered necessary.

Hereupon the winding together with the pre-filled pieces is impregnated in a way in itself known. It is preferable to perform the impregnating by means of the so-called vacuum-pressure impregnation method by using a substantially solvent-free thermoset plastics that is polymerized by means of heat and/or accelerators.

What we claim is:

1. A method for the manufacture of a support structure for the coil ends in an electrical machine comprising arranging in the winding at least one hollow supporting body having a porous wall and filled with substantially particulate filler agent and thereafter impregnating the body with a liquid hardenable impregnation agent and hardening the impregnation agent, at least part of the particles and particle size distribution in the filler agent being of a magnitude suitable for blocking pores in the porous wall and thereby reducing the flow-off of the impregnation agent from the filler agent after the impregnation.

2. A method as in claim 1 wherein said body is a tube of the shape of a ring.

3. A method as in claim 1 wherein said body is a bag made of a porous material.

4. A method as in claim 1 wherein particulate filler agent contains particles of different size and wherein the size of the particles is in the range 1 μm to 1 mm.

5. A method as in claim 1 wherein the impregnation is performed by means of the vacuum-pressure impregnation method.

6. A method as in claim 1 wherein the impregnating agent is a substantially solvent-free thermoset plastics that is polymerized by the effect of heat and/or accelerators.

7. A method as in claim 1 wherein at least part of the filler agent consists of quartz particles whose particle size is 1 μm to 1 mm.

8. A method as in claim 1 wherein at least part of the powdery filler agent consists of glass balls whose particle size is 1 μm to 1 mm.

9. A method as in claim 1 wherein at the maximum 30 percent by weight of the powdery filler agent consists of fibres whose fibre length is at the maximum 10 mm.

* * * * *